United States Patent Office 3,338,879
Patented Aug. 29, 1967

3,338,879
PURIFICATION OF POLYOLEFINS EMPLOYING A PHENOL TO RENDER THE POLYMER SLURRY INSENSITIVE TO AIR
Abraham Kutner, Newark, Del., assignor to Hercules Incorporated, a corporation of Delaware
No Drawing. Filed Nov. 18, 1964, Ser. No. 412,229
7 Claims. (Cl. 260—94.9)

The present invention relates to a process for the purification of stereoregular polyolefins prepared by a low-pressure process in a liquid diluent.

There is known a process of polymerizing ethylene and other α-olefins under relatively mild conditions of temperture and pressure by using as a polymerization catalyst a compound of a metal of Groups IV–B or V–B of the Periodic Table in combination with an organometallic compound of a metal of Group III–A of the Periodic Table. The process is usually carried out by adding the catalyst to an inert organic diluent which is liquid under the reaction conditions and then passing the ethylene or other olefin into the catalyst mixture at atmospheric or slightly elevated pressure and at room temperature or slightly above. When an olefin is so polymerized, a highly crystalline stereoregular polymer is obtainable which has many industrial uses. In the process, the polymer, which is insoluble in the reaction medium, precipitates out and can be separated from the diluent by any of the usual means such as filtration, centrifugation, etc. However, when no steps are taken to purify the polymer, it normally contains a large quantity of catalyst residues which adversely affect its color, its stability, and its electrical properties, and also render it corrosive to metal. Hence, it has been necessary to devise methods for purifying these polymers to rid them of the catalyst residues which are inherently present at the completion of the polymerization process.

Numerous methods have been suggested for purifying the stereoregular polyolefins. One such method comprises washing the polymer, after separation from the polymerization diluent, with mineral acids, as, for example, methanolic hydrochloric acid, aqueous solutions of nitric acid, etc. This type of treatment gives very pure polymers but requires the use of considerable quantities of expensive reagents.

By another process which has been suggested, the polyolefin, while still slurried in the polymerization diluent, is treated with an alkanol to solubilize the catalyst residues and the alkanol-containing slurry is then washed with an aqueous liquid to extract the catalyst residues from the slurry. The diluent phase, containing the polymer, and the aqueous phase, containing the catalyst residues, are then separated by decantation. The latter method generally gives excellent results in that the amount of metal residues contained in the purified polymer is generally reduced to about 200 parts per million. There is still need, however, for a process for purifying these polyolefins which reduces the amount of catalyst residues in the polymers to an even lower amount.

One of the most effective processes known for removing the metallic catalyst residues from these polyolefin slurries is described in British Patent 840,233. In this process, the polymer slurry is treated with an alcohol to solubilize the catalyst residues, as in the process described immediately above; solid polymer is then separated from the slurry, e.g., by filtration; and finally, the polymer is washed with a liquid hydrocarbon. This process, when properly carried out, results in extremely low levels of catalyst residues in the polymer. However, it is necessary, in order to obtain the full benefits of the process, to effect the separation of polymer in an inert atmosphere such as nitrogen, because contacting of the slurry with air and moisture causes precipitation of the metal catalyst residues and consequently higher metal content in the polymer. The maintenance of an inert atmosphere during the separation of the polymer is cumbersome and costly. The art, therefore, would very much welcome any improvement in the method which would permit handling the alcohol-treated slurry in the presence of air.

The present invention is directed to an improvement in the process of the aforesaid British patent, which improvement comprises adding to the alcohol-treated slurry from about 0.5 to about 2.5 moles per mole of total metal residues of phenol or a substituted phenol having the structural formula

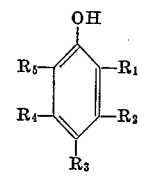

wherein $R_1$ to $R_5$ represent hydrogen, or an organic radical such as alkyl radicals, aryl radicals, alkaryl radicals, aralkyl radicals, alkoxy radicals, aryloxy radicals, alkylaryloxy radicals, carboalkoxy radicals, carboaryloxy radicals, or carboalkaryloxy radicals. The radicals $R_1$ to $R_5$ can be the same or different except that when either $R_1$ to $R_5$ is a bulky substituent which hinders the reactivity of the phenolic hydroxyl group, the other ortho substituent must be methyl or hydrogen.

Examples of bulky substituents which hinder the reactivity of the phenolic hydroxyl group include, inter alia, the t-butyl radical, cyclohexyl radical, amyl radical, t-amyl radical, and the t-hexyl radical.

Though all phenols and organo substituted phenols having less than 2 bulky, hindering substituents are effective in the process of this invention, the preferred phenols are mono and disubstituted long chain alkyl or alkaryl phenols and alkyl or alkaryl esters of salicylic acid, wherein the alkyl chain has 8 to 18 carbon atoms. Typical phenols that can be used in the process of the invention include phenol, o-ethylphenol, o-t-butylphenol, m-hexylphenol, p-octylphenol, m-octylpenol, p-t-butylphenol, p-dodecylphenol, o-dodecylphenol, p-decylphenol, m-decylphenol, p-benzylphenol, o-benzylphenol, 3,4-dimethylphenol, 3,5-diethylphenol, 3,4-dihexylphenol, o-phenylphenol, octylphenylphenol, octadecylphenol, hydroquinone monophenyl ether, phenyl salicylate, octylphenyl salicylate, nonyl salicylate, 3-butyl phenyl salicylate, etc. This list is not intended to be all inclusive, but merely representative of the large number of useful phenols.

By virtue of the process of this invention, the slurry is surprisingly rendered insensitive to air and moisture, and further steps in the recovery and purification of the polymer can be taken without regard to the maintenance of an inert atmosphere. In fact, even when the slurry is allowed to come in contact with air of exceptionally high humidity, it has been possible on some trials to prepare polymers containing as little as 10 parts per million of total metal.

In accordance with an optional feature of the invention, there is added to the slurry, either prior to or following the addition of the phenol, a small amount of alkylene oxide, such as propylene oxide, the purpose of which is to neutralize any hydrochloric acid present in the slurry and thereby reduce its corrosivity to the apparatus employed in the work-up. The addition of alkylene oxide is, of course, not essential, but is desirable since it makes possible the use of less expensive apparatus.

In order to avoid any premature oxidation of polymer which might occur upon filtration of the slurry, especially at elevated temperatures, it is sometimes desirable to add a small amount of an antioxidant such as 2,6-di-t-butyl-p-cresol to the slurry prior to filtration. Usually an amount of from about 0.1 to 1% antioxidant, based on the weight of polymer, will suffice.

The invention is illustrated by the following examples in which parts and percentages are by weight unless otherwise specified.

*Examples*

In these examples, propylene was polymerized by passing gaseous propylene into a liquid, saturated aliphatic hydrocarbon diluent having a boiling range of 170 to 200° C. containing titanium trichloride in the amount of 5 mM. per liter and diethylaluminum chloride in the amount of 10 mM. per liter of liquid. The polymerization was carried out for 6 hours at 50° C. under 28 p.s.i.g. of propylene.

At the end of the polymerization there was present in the polymerizer a slurry of fine particles of stereoregular polypropylene in the polymerization diluent, the polypropylene constituting about 35% of the slurry.

To the slurry there was added a predetermined amount of an alkanol under an atmosphere of nitrogen and the slurry was stirred for approximately 2 hours at 80° C. There was then added to the slurry a predetermined amount of a phenol of the type previously described. (In some cases, 10 minutes prior to the addition of the phenol, propylene oxide in the amount of 3 ml. per liter of diluent was added.)

A portion of the slurry was removed from the polymerizer, stirred in humid air (80% R.H. at 75° F.) for 10 minutes, filtered, and the filter cake washed with n-heptane at 70° C., and the n-heptane removed by drying. The portion of the slurry remaining in the polymerizer was filtered under nitrogen without exposure to air, and the filter cake was washed in the same manner that the filter cake from the air-exposed slurry was washed. The following table presents the data obtained from several polymerizations carried out in the manner described and also control polymerizations in which no phenol was added to the slurry.

polymer produced in the polymerization of any α-olefin, e.g., ethylene, propylene, butene-1, 4-methylpentene-1, etc., or copolymers of such olefins, using the aforesaid catalyst system. In accordance with this known polymerization method, the olefin is contacted at relatively low pressure and temperature with a catalyst prepared by mixing a compound of a transition metal of Groups IV–B or V–B of the Periodic Table with an organometallic compound of a metal of Group III–A of the Periodic Table. The so-called transition metal compound may be an inorganic salt such as a halide, oxyhalide, etc., or an organic salt or complex such as an acetylacetone, etc. Exemplary of the transition metal compounds that may be used are titanium and zirconium tetrachlorides, titanium di- and trichloride, tetrabutyl titanate, zirconium acetylacetonate, vanadium oxyacetylacetonate, etc. The organometallic compound that is reacted with one of the transition metal compounds or mixtures thereof may be, for example, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes, as for example, sodium aluminum tetraethyl, lithium aluminum tetraoctyl, etc.

Another method of carrying out the polymerization process is to use a two-component catalyst system. In one such system the insoluble precipitate which is formed by mixing the transition metal compound and the organometallic compound as described above is separated and then used in combination with an additional organometallic compound. The insoluble reaction product will be readily separated, if the reaction has taken place in an inert diluent, from the diluent and soluble reaction by-products by centrifuging, filtering, or any other desired means. In some cases it may be desirable to wash the insoluble reaction product with additional amounts of

TABLE I

| Example | Alcohol (1.5% of Slurry) | Propylene Oxide (ml./liter diluent) | Phenol | mM. phenol / mM. (Ti+Al) | Polymer Analysis (p.p.m.) | | | |
|---|---|---|---|---|---|---|---|---|
| | | | | | $N_2$ | | Humid Air | |
| | | | | | Ti | Al | Ti | Al |
| Control A | n-Butanol | 0 | 0 | | 18 | 25 | 180 | >200 |
| Control B | do | 3.3 | 0 | | 16 | 20 | >200 | >200 |
| 1 | do | 0 | Nonyl-phenol | 1.0 | 5 | 8 | 6 | 10 |
| 2 | do | 3.3 | do | 0.5 | 42 | 42 | 20 | 30 |
| 3 | do | 3.3 | do | 1.0 | <10 | 35 | 22 | 35 |
| 4 | do | 3.3 | Octylphenyl salicylate | 1.0 | 8 | 9 | 10 | 17 |
| 5 | do | 3.3 | Phenyl salicylate | 1.0 | 9 | 10 | 11 | 14 |
| 6 | do | 3.3 | Salicylic acid | 0.8 | 12 | 14 | 24 | 42 |
| 7 | Isopropanol | 0 | do | 1.5 | 10 | 12 | 15 | 17 |
| 8 | do | 3.3 | 2,6-di-t-butyl-p-cresol | 1.3 | 18 | 20 | 92 | >200 |
| 9 | n-Butanol | 3.3 | Nonylphenol-acetone condensate | 1.3 | 17 | 25 | 43 | 72 |
| 10 | do | 3.3 | o-t-butylphenol | 1.3 | 17 | 26 | 35 | 50 |
| 11 | do | 3.3 | Phenol | 1.3 | 23 | 42 | 31 | 75 |

As seen from the data in the table, when the phenol is omitted as in Control A, the portion of the slurry that is worked up in the presence of air yields a polymer of unacceptably high metal content, although the portion of the slurry worked up under nitrogen gives acceptably low metal content. In Control B, it is shown that the addition of propylene oxide has no effect on reducing the metal content of the polymer worked up in the presence of air; it does, however, reduce the acidity of the slurry and renders it less corrosive to metal apparatus. As the table shows, when the long-chain alkyl phenol is present, the metal content is acceptably low even in the presence of the air. Example 8 shows the inoperability of phenols containing two bulky hindering substituents.

The process of the invention may be applied to the hydrocarbon diluent in order to remove all of the soluble by-products completely. This hydrocarbon-insoluble reaction product is then used in combination with an organometallic compound as exemplified above. This second catalyst component may be the same organometallic compound that was used in preparing the insoluble reaction product catalyst component or it may be a different organometallic compound. Of particular importance is the use of such a hydrocarbon-insoluble reaction product in combination with an aluminum trialkyl such as triethylaluminum, triisobutylaluminum, trioctylaluminum, etc.

In another two-component catalyst system, the whole reaction mixture formed on mixing a transition metal compound and an organometallic compound may be used in combination with an additional organometallic compound, if the latter is halogen-free. This two-component catalyst system is particularly useful for the polymerization of linear α-olefins.

These polymerization processes are carried out in a wide variety of ways, as, for example, as batch or continuous operations and with or without the use of an inert organic diluent as the reaction medium. However, for the purpose of the present invention there must be used an inert, organic diluent that is liquid under the reaction conditions. Preferred diluents are saturated aliphatic hydrocarbons boiling in the range of 70–250° C.

As pointed out already, the transition metal compound and the organometallic compound may be reacted in situ, as, for example, in the particularly effective method of polymerizing diolefins wherein a trialkylaluminum is reacted in situ with a tetraalkyl titanate. They may also be reacted prior to the introduction of the olefin or they may be reacted and then used in combination with additional organometallic compound. They may also be added in increments during the polymerization and many other such variations may be utilized. Many other variations may be made in the polymerization system to which the process of this invention may be applied. For example, when lower molecular weight polymers are desired, a viscosity reducing agent such as a haloalkane, as, for instance, carbon tetrachloride, etc., or hydrogen, or other such agent may be added.

According to the invention, the first step in working up the slurry to recover high quality polymer is treatment with an alkanol, the purpose of this step being to solubilize the catalyst residues and thus render them more easily removable in subsequent steps. The alkanol used in this step is preferably one of those in the methanol to dodecanol series including branched chain alkanols, e.g., ethanol, propanol, isopropanol, n-butanol, sec-butanol, t-butanol, isobutanol, n-octanol, 2-ethylhexanol, n-decanol, etc.

The amount of alkanol added at the end of the polymerization may be varied widely and will depend chiefly upon the amount of catalyst used in the polymerization and other reaction conditions, but in general is from about 0.1% to about 10% of the volume of the polymer slurry, and preferably is from about 1% to about 5%. Much larger quantities may be used but are not believed to serve any useful purpose and hence are not usually desired for practical considerations. The alkanol treatment may be carried out at any desired or practical temperature, but generally will be from about 0° C. to about 100° C., and preferably from about 25° C. to about 80° C. Only a short holding time is required for the alkanol treatment, depending upon the temperature, catalyst, etc. In general, a period of from about 5 minutes to 1 hour is adequate, but any longer period of time is practical, as, for example, overnight, etc. The alkanol treatment is carried out in an inert atmosphere, i.e., in the absence of oxygen, water, etc., and hence an oxygen- and water-free atmosphere is used, as, for example, nitrogen or other inert gas.

The process as it has been described up to this point is well known in the art. At this point, however, the invention departs from the art by the addition of a small quantity of a phenol to the alkanol-treated slurry. The phenol can be added while the slurry is at a temperature ranging from about 25 to 80° C. The amount of phenol can vary from about 0.5 to about 2.5 mole per mole of total metal in the slurry. The slurry is next simply agitated for a period of time ranging from about 5 to 60 minutes, and by virtue of this treatment has acquired relative insensitivity to air and moisture while the catalyst residues remain in solution.

It is now possible to separate the polymer from the slurry in the presence of air, even very humid air. Separation can be effected by filtration, centrifugation, or any equivalent technique. The elimination of the need for carrying out the separation in the absence of air is a remarkable step forward in the art since it eliminates the cumbersomeness and expense of maintaining an inert atmosphere.

Following separation of the polymer, it is simply washed with an inert liquid hydrocarbon. Any liquid hydrocarbon or mixture of such hydrocarbons may be used for the washing, as, for example, aliphatic hydrocarbons such as n-hexane, n-heptane, and aromatic hydrocarbons such as benzene, toluene, and xylene, and cycloaliphatic hydrocarbons such as cyclopentane, cyclohexane, and the like. For practical reasons, the washing is usually carried out at room temperature but may be carried out at elevated temperatures up to about 80° C., if desired In order to remove the hydrocarbon washing liquid from the polymer, a simple drying operation is adequate in most cases. In other cases, it may be desirable to subject the polymer to a steam distillation treatment before drying in order to remove all traces of the hydrocarbon liquid.

What I claim and desire to protect by Letters Patent is:

1. In the process for removing catalyst residues from a polyolefin which has been obtained by polymerizing an olefin in the presence of a catalyst comprising a compound of a metal selected from the group consisting of the metals of Groups IV–B and V–B of the Periodic Table in combination with an organometallic compound of a metal of Group III–A of the Periodic Table in the presence of an inert liquid diluent wherein the slurry of solid polymer in diluent that is obtained from the polymerization is treated with an alkanol to solubilize the catalyst residues, following which the polymer is separated from the slurry and washed with an inert liquid hydrocarbon, the improvement which comprises rendering the slurry insensitive to air and moisture by adding to the alkanol-treated slurry, prior to separation of the polymer therefrom, about 0.5 to about 2.5 moles per mole of total metal in the slurry of a phenol having the formula

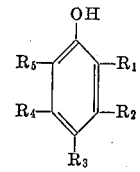

where $R_1$, $R_2$, $R_3$, $R_4$, and $R_5$ are selected from the class consisting of alkyl radicals, aryl radicals, alkaryl radicals, aralkyl radicals, alkoxy radicals, aryloxy radicals, alkylaryloxy radicals, carboalkyloxy radicals, carboaryloxy radicals, carboalkaryloxy radicals and hydrogen, said substituents being so selected that the reactivity of the phenolic hydroxyl group is substantially unhindered.

2. The process of claim 1 where the phenol is selected from the class consisting of alkyl phenols, alkaryl phenols, alkyl esters of salicylic acid and alkaryl esters of salicylic acid having 8 to 18 carbon atoms in the alkyl chain.

3. The process of claim 2 where the polyolefin is polypropylene.

4. The process of claim 2 where the polyolefin is polyethylene.

5. The process of claim 2 where the phenol is nonylphenol.

6. The process of claim 2 where the phenol is octylphenyl salicylate.

7. The process of claim 2 where the slurry is also treated with propylene oxide.

No references cited.

JOSEPH L. SCHOFER, *Primary Examiner.*

L. EDELMAN, *Assistant Examiner.*